(12) United States Patent
Haubennestel et al.

(10) Patent No.: US 6,617,468 B2
(45) Date of Patent: Sep. 9, 2003

(54) RHEOLOGICALLY ACTIVE UREA URETHANE COMPOUNDS

(75) Inventors: Karlheinz Haubennestel, Wesel (DE); Ulrich Orth, Wesel (DE); Axel Woocker, Rees (DE); Heribert Holtkamp, Wesel (DE); Christoph Buchmann, Wesel (DE)

(73) Assignee: BYK-Chemie GmbH (DE)

( * ) Notice: Subject to any disclaimer, the term of this patent is extended or adjusted under 35 U.S.C. 154(b) by 0 days.

(21) Appl. No.: 09/931,192

(22) Filed: Aug. 16, 2001

(65) Prior Publication Data

US 2002/0115882 A1 Aug. 22, 2002

Related U.S. Application Data

(60) Provisional application No. 60/303,762, filed on Jul. 6, 2001.

(30) Foreign Application Priority Data

Aug. 16, 2000 (DE) .......................................... 100 39 837

(51) Int. Cl.[7] ...................... C07C 269/00; C07C 271/00
(52) U.S. Cl. ........................................... 560/25; 560/26
(58) Field of Search ...................................... 560/25, 26

(56) References Cited

U.S. PATENT DOCUMENTS

| 4,314,924 A | 2/1982 | Haubennestel et al. | 260/30.6 R |
|---|---|---|---|
| 4,851,294 A | 7/1989 | Buter et al. | 428/425.8 |
| 5,868,826 A | * | 2/1999 | Fischer et al. |

FOREIGN PATENT DOCUMENTS

| DE | 2822908 | 7/1979 | ............. C09D/5/04 |
|---|---|---|---|
| EP | 0 006 252 | 1/1980 | ............. C09D/7/00 |
| EP | 0 198 519 | 10/1986 | ............. C09D/5/04 |

* cited by examiner

*Primary Examiner*—Samuel Barts
*Assistant Examiner*—Paul A. Zucker
(74) *Attorney, Agent, or Firm*—Schwegman, Lundberg, Woessner & Kluth, P.A.

(57) ABSTRACT

The invention relates to a process for preparing a solution which comprises urea urethanes and is effective as a thixotropic agent, which involves reacting at least two structurally different monohydroxy compounds with an excess of toluene diisocyanate to form monoisocyanate adducts, removing the unreacted portion of the toluene diisocyanate, and reacting the resultant monoisocyanate adducts with diamines in an aprotic solvent in the presence of a lithium salt to form urea urethanes. The invention also relates to the use of the solution to receive thixotropic coating compositions.

20 Claims, No Drawings

RHEOLOGICALLY ACTIVE UREA URETHANE COMPOUNDS

CROSS-REFERENCE TO RELATED APPLICATIONS

This application claims benefit of U.S. provisional patent application Ser. No. 60/303,762, filed Jul. 6, 2001 and priority of German patent application Serial No. DE 100 39 837.5, filed Aug. 16, 2000, both of which are incorporated herein by reference.

FIELD OF THE INVENTION

The invention relates to a process for preparing a solution which comprises urea urethanes and is effective as a thixotropic agent, which involves reacting monohydroxy compounds with an excess of toluene diisocyanate, removing the unreacted portion of the toluene diisocyanate from the reaction mixture, and further reacting the resultant monoisocyanate adducts with diamines in an aprotic solvent in the presence of a lithium salt to give urea urethanes. The invention additionally relates to the use of the solution to receive thixotropic coating compositions.

BACKGROUND OF THE INVENTION

In order to control the rheology of liquid coating systems, predominantly organically modified bentonites, silicas, hydrogenated castor oil and polyamide waxes are used. A disadvantage of these substances is that they are mostly dry solids which have to be brought into the form of a semi-finished product using solvents and shear forces, and incorporated into the liquid coating system under careful temperature control. Failure to observe such temperatures results in crystallites in the finished coating system, which may lead to defects in the coating.

The general disadvantage of these presently used theological auxiliaries is that they lead to turbidities and haze in clear, transparent coatings. Moreover, handling dry pulverulent products which give rise to dusts in the course of processing is undesirable.

Different solutions for rheology control have been described in European Patent Application EP-A-0 198 519. There, an isocyanate is reacted with an amine in the presence of solutions of film-forming resin to give a urea which forms acicular crystals in very finely disperse form. The film-forming binders thus modified are sold as rheology-controlling and anti-sagging binders, referred to as sag control agents. The disadvantage of these products is that they are always bound to the binders in which they were prepared, and there is no possibility of subsequent, universal correction of finished coating compositions.

European Patent EP-B-0 006 252 describes a process for preparing a thixotropic agent that removes some of the abovementioned disadvantages, describing urea urethanes which are prepared by reaction of isocyanate adducts with polyamines in aprotic solvents in the presence of lithium salts. The products prepared, however, have two significant disadvantages. Firstly, these thixotropic agents are characterized by an undefined structure owing to the preparation process. Although monoisocyanate adducts are described, the actual products are in fact not monoadducts at all, as is clearly evident from the example, but rather mixtures of different adducts. In the process described, one mole of a diisocyanate is first reacted with one mole of a monoalcohol. By this process the desired NCO-functional monoadducts are partially formed, but also non-NCO-functional diadducts, which in the course of subsequent reaction with polyamines in the presence of lithium chloride leads to uncontrolled chain extension of the urea urethane and to polymeric ureas. These products then tend to display precipitation phenomena and are extremely difficult to keep in solution. A further disadvantage of the thixotropic agents prepared by this process can be recognized in the fact that always only monoisocyanate adducts with the same structure are reacted with the diamine. This leads firstly to limited compatibility in the coating systems used, manifested in gel structures or severe turbidities, and secondly to a poorer rheological effectiveness.

It is therefore an object of the present invention to find thixotropic agents which on the one hand have a defined structure and therefore permit relatively high storage stability of the solution thus prepared, over several months, and on the other are characterized by a relatively broad compatibility in binders, thereby permitting reliable use of the products. This is of particular interest in modem coating systems which are relatively polar formulations, such as waterborne coating materials or high-solids systems, for example.

Surprisingly it has been found that this object can be achieved in a process of the type specified at the outset by reacting at least two structurally different monoisocyanate adducts, which differ in their alcohol component, with the diamines to give urea adducts.

SUMMARY OF THE INVENTION

The present invention accordingly provides a process in which at least two structurally different monohydroxy compounds of the general structure R—OH, in which R represents an n-alkyl radical or an iso-alkyl radical having from 4 to 22 carbon atoms, an alkenyl radical having from 3 to 18 carbon atoms, a cycloalkyl radical, an aralkyl radical, or a radical of the formula $C_mH_{2m+1}(O-C_nH_{2n})_x$, $C_mH_{2m+1}(OOC-C_vH_{2v})_x$ or $Z-C_6H_4(O-C_nH_{2n})_x$, in which m is 1–22, n is 2–4, x is v is 4 or 5 and Z is an alkyl radical having from 1 to 12 carbon atoms, are reacted with a from 1.5- to 5-fold excess of toluene diisocyanate to give monoisocyanate adducts of the general structure (I)

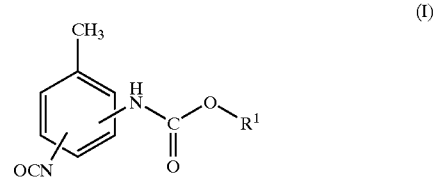

and the unreacted portion of the toluene diisocyanate is removed from the reaction mixture, and the resultant monoisocyanate adducts are reacted with diamines of the formula $H_2N-R^3-NH_2$, in which $R^3$ is a radical having the formula $-C_iH_{2i}-$, where i is from about 2 to about 12; $-(C_pH_{2p}-O-C_pH_{2p})_q$, where p is from about 2 to about 4 and q is from about 1 to about 10;

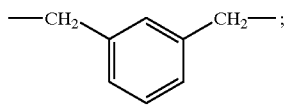

-continued

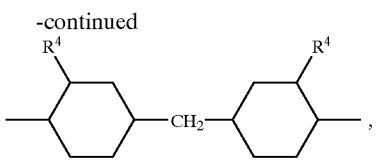

where R⁴ is CH₃ or hydrogen;

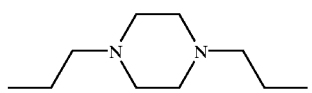

or mixtures thereof in an aprotic solvent in the presence of a lithium salt to give urea adducts of the general structure (II)

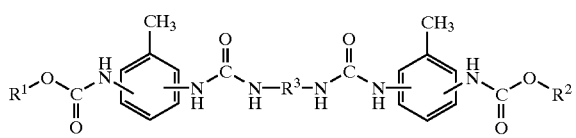

(II)

wherein the radicals $R^1$ and $R^2$ satisfy the conditions for the radical R.

In the process of the invention, the abovementioned diamines may be replaced in whole or in part by paraxylylenediamine of the formula

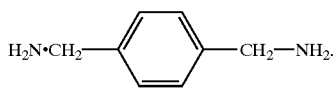

Alkyl, alkoxy, alkylene, etc. denote both straight and branched groups; but reference to an individual radical such as "propyl" embraces only the straight chain radical, a branched chain isomer such as "isopropyl" being specifically referred to. Alkylene denotes a divalent straight or branched alkyl group (e.g., methylene (—CH₂—) or ethylene (—CH₂CH₂—)). When alkyl or alkylene can be partially unsaturated, the alkyl chain may comprise one or more (e.g. 1, 2, 3, or 4) double or triple bonds in the chain.

By the process of the invention, the solution which comprises urea urethanes and is active as a thixotropic agent may be obtained in principle by two different routes:

a) on the one hand, it is possible first to mix at least two structurally different alcohols R—OH (i.e., $R^1$—OH and $R^2$—OH) and then to react the mixture with a from 1.5-to 5-fold excess of toluene diisocyanate. The unreacted portion of the toluene diisocyanate is subsequently removed from the reaction mixture under gentle conditions, in accordance with the prior art, and the resultant mixture of the structurally different monoisocyanate adducts is then reacted with the diamines in an aprotic solvent in the presence of a lithium salt to give urea urethanes of the general structure (II).

b) on the other hand, it is possible first to react at least two structurally different alcohols R—OH separately from one another with a from 1.5- to 5-fold excess of toluene diisocyanate. The unreacted portion of the toluene diisocyanate is removed from the respective reaction mixture under gentle conditions, in accordance with the prior art, and the resultant, structurally different monoisocyanate adducts are mixed with one another. The resultant mixture of structurally different monoisocyanate adducts is then reacted with the diamines in an aprotic solvent in the presence of a lithium salt to give urea urethanes of the general structure (II).

The molar fraction of the respective monoisocyanate adducts in the mixture of structurally different monoisocyanate adducts is between 20 and 80%, preferably between 35 and 65%, with particular preference between 45 and 55%, the sum of the molar fractions of the monoisocyanate adducts being 100%. The molar excess of tolylene diisocyanate is preferably from 1.5 to 5.0 mol, with particular preference from 2.0 to 4.0 mol.

The solids content of the urea urethane solutions produced is from 5 to 80%, preferably from 20 to 60%, with particular preference from 25 to 50%. The reaction of the monoisocyanate adduct mixtures with the diamine takes place in polar aprotic solvents, such as dimethyl sulfoxide, N,N-dimethylformamide, N,N-dimethylacetamide, N-methylpyrrolidone, N-butylpyrrolidone or comparable alkylpyrrolidones, or mixtures thereof, for example.

The fraction of lithium compounds is from 0.2 to 2 mol, preferably from 0.5 to 1.5 mol, with particular preference from 0.75 to 1.25 mol of lithium based on the amine equivalent of the diamine used.

Particularly advantageous is the use of $LiNO_3$ rather than LiCl, since chloride ions have adverse effects in coating systems and may promote the corrosion of the metallic substrates to which the thixotropic coating systems are applied.

The alcohols R—OH used to prepare the monoisocyanate adducts preferably comprise linear or branched primary alcohols which may be saturated or unsaturated, such as n-butanol, 2-ethylhexanol, isotridecyl alcohol, Guerbet alcohols of chain length $C_{10}$ to $C_{20}$, oleyl alcohol, linoleyl alcohol, lauryl alcohol, stearyl alcohol, for example, but cycloaliphatic alcohols, such as cyclohexanol or its alkyl-substituted derivatives, for example, and, additionally, aromatically substituted alkanols such as benzyl alcohol, are also suitable.

Particularly suitable for adjusting the polarity are the alkoxylated derivatives of the abovementioned alcohols, in which case lower alcohols such as methanol or allyl alcohol, for example, may also be used as starting components for the alkoxylation. The products thus prepared include preferably ethylene oxide and/or propylene oxide units in the chain and may contain these units in alternation or in blocks. For the alkoxylation it is also possible to use aromatic alcohols such as phenols or alkyl-phenols, for example, as starting components. Preferred alkoxylated alcohols are methoxypolyethylene glycol 500, methoxypolyethylene glycol 350 and triethylene glycol monobutyl ether (butyl triglycol).

In order to adjust the compatibility of the urea urethanes of the invention to modern binder systems, it is also possible to incorporate ester groups or polyester groups into the alcohol component, for example by addition reaction of lactones, such as ε-caprolactone, for example, with the abovementioned alcohols or alcohol alkoxylates, or by the use of hydroxy-functional (meth)acrylates.

The diisocyanates which are used to form the monoisocyanate adducts substantially comprise tolylene diisocyanates in the known and customary isomer distribution-in the course of the distillation of the excess fractions of diisocyanate, shifts may occur in the proportion of isomers, so that higher proportions of 2,6-toluene diisocyanate than commonly available commercially may also be formed.

These distillates may be used again in the preparation of further monoadducts. Preference is given to toluene diisocyanate isomers having a 2,4-isomer fraction of from 50 to 100%.

The diamines of the formula $H_2N-R^3-NH_2$ that substantially comprise linear diamines of chain length $C_2$ to $C_{12}$ which may be straight-chain or branched, such as 1,3-propanediamine, hexamethylenediamine, octamethylenediamine, diaminododecane or neopentanediamine, for example. Likewise suitable are cyclic diamines such as 4,4'-diaminodicyclohexylmethane or 3,3'-dimethyl-4,4'-diamino-dicyclohexylmethane, for example. Particular preference is given to aromatic-aliphatic diamines such as meta-xylylenediamine or para-xylylenediamine, for example. The diamines may also be used as a mixture in order to form the urea, since by this means the crystallization tendency of the urea urethane in solution is reduced.

The urea urethanes prepared by the process of the invention contain neither free isocyanate nor free amino groups. Accordingly, they are physiologically acceptable. Moreover, there are no adverse side-reactions with binders or fillers.

The storage stability of the urea urethane solutions prepared in this way is extremely high and at normal storage temperatures is easily 6 months or more. Furthermore, the urea urethane solutions possess broad compatibility in binders and therefore permit reliable use of the thixotropic agents.

The present invention additionally provides for the use of the urea urethane solution prepared by the process of the invention to render coating compositions thixotropic. The coating compositions comprise, preferably, aqueous, solvent-borne and solvent-free coating materials, PVC plastisols, epoxy-based coatings, and those based on unsaturated polyester resins.

The main features of the process of the invention are illustrated by the following working examples.

EXAMPLES

Comparative Example in Accordance with EP-B-0 006 252

1 mol (174 g) of toluene diisocyanate (65% 2,4-isomer, called T65 below) is charged to a reaction vessel, 1 mol of methoxypolyethylene glycol (average MW: 350 g/mol) is slowly added dropwise, with stirring, and the reaction is completed in accordance with a known process. During the reaction, the temperature is held below 40° C. The isocyanate adduct thus prepared still has a free toluene diisocyanate (TDI) content of 6.3%; the total NCO content is 8.05%. This reaction mixture is added to a solution of 0.5 mol of xylylenediamine (68 g) and 0.75 mol of LiCl, based on amine equivalent, in N-methylpyrrolidone (NMP). The solids content (SC) is 50%. The reaction is exothermic. The initially clear product tends to form gel after storage for 2 months.

Preparation of the Monoadducts

Examples 1–7

Example 1

0.5 mol (37 g) of n-butanol is added over 2 hours at 30° C. to 1.25 mol (217.5 g) of toluene diisocyanate (80% 2,4-isomer, called T80 below). The temperature is held below 45° C. After the end of the addition, stirring is continued for 2 h until the theoretical NCO content of 33.0% has been reached. The excess isocyanate is removed by vacuum (0.1 mbar) distillation at from 150 to 170° C. The NCO content is 16.9%, the free TDI content <0.5%.

Example 2

0.25 mol (53 g) of butyl triglycol is added over 2 hours at RT to 0.625 mol (108.75 g) of toluene diisocyanate (T65). The temperature is held below 45° C. After the end of the addition, stirring is continued for 2.5 h until the theoretical NCO content of 25.8% has been reached. The excess isocyanate is removed by vacuum (0.1 mbar) distillation at from 150 to 170° C. The NCO content is 10.9%, the free TDI content <0.5%.

Example 3

0.25 mol (50 g) of iso-tridecanol is added over 2 hours at 40° C. to 0.75 mol (130.5 g) of toluene diisocyanate (T65). The temperature is held below 60° C. After the end of the addition, stirring is continued for 2 h until the theoretical NCO content of 29.1% has been reached. The excess isocyanate is removed by vacuum (0.1 mbar) distillation at from 150 to 170° C. The NCO content is 11.3%, the free TDI content <0.5%.

Example 4

0.25 mol (18 g) of butanol is reacted with 0.5 mol (57 g) of caprolactone and 0.1% (0.075 g) of dibutyl tin dilaurate (DBTL) at 160° C. for 6 h and then cooled to 50° C. The hydroxy ester thus prepared (BuCP2) (hydroxyl number 186) is metered at 40° C. over 2 h into 0.75 mol (130.5 g) of toluene diisocyanate. The temperature is held below 60° C. After the end of the addition, stirring is continued for 2 h until the theoretical NCO content of 26.2% has been reached. The excess isocyanate is removed by vacuum (0.1 mbar) distillation at from 150 to 170° C. The NCO content is 9.2%, the free TDI content <0.5%.

Example 5

0.2 mol (70 g) of methoxypolyethylene glycol 350 is added over 2 hours at 50° C. to 0.6 mol (104.4 g) of toluene diisocyanate (T80). The temperature is held between 50° C. and 55° C. After the end of the addition, stirring is continued for 3 h until the theoretical NCO content of 24.1% has been reached. The excess isocyanate is removed by vacuum (0.1 mbar) distillation at from 150 to 170° C. The NCO content is 8.0%, the free TDI content <0.5%.

Example 6

0.2 mol (100 g) of methoxypolyethylene glycol 500 is added over 2 hours at 50° C. to 0.6 mol (104.4 g) of toluene diisocyanate (T80). The temperature is held between 50° C. and 55° C. After the end of the addition, stirring is continued for 3 h until the theoretical NCO content of 20.5% has been reached. The excess isocyanate is removed by vacuum (0.1 mbar) distillation at from 150 to 170° C. The NCO content is 6.2%, the free TDI content <0.5%.

Example 7

A mixture of 0.2 mol (100 g) of methoxypolyethylene glycol 500 (and 0.2 mol (70 g) of methoxypolyethylene glycol 350 is added over 2 hours at 50° C. to 0.8 mol (139.2 g) of toluene diisocyanate (T80). The temperature is held between 50° C. and 55° C. After the end of the addition, stirring is continued for 3 h until the theoretical NCO content of 16.3% has been reached. The excess isocyanate is removed by vacuum (0.1 mbar) distillation at from 150 to 170° C. The NCO content is 7.0%, the free TDI content <0.5%.

TABLE 1

Monoadducts

| Example | Alcohol | NCO content | Equivalent weight | Molar ratio TDI:alcohol |
|---|---|---|---|---|
| 1 | Butanol | 16.9% | 248 | 2.5:1 |
| 2 | Butyl triglycol | 10.9% | 392 | 2.5:1 |
| 3 | Iso-tridecanol | 11.3% | 372 | 3:1 |
| 4 | BuCP2 | 9.2% | 457 | 3:1 |
| 5 | MPEG 350 | 8.0% | 525 | 3:1 |
| 6 | MPEG 500 | 6.2% | 675 | 3:1 |
| 7 | MPEG 350/MPEG 500 1:1 | 7.0 | 600 | 2:1 |

TABLE 2

Mixtures of the monoadducts from Table 1

| Mixture | Monoadduct mixture | Molar ratio |
|---|---|---|
| A | Butyl triglycol/iso-tridecyl (from Ex. 2 + 3) | 1:1 |
| B | Butyl triglycol/MPEG 500 (from Ex. 2 + 5) | 1:1.75 |
| C | Butyl triglycol/MPEG 350/MPEG 500 (from Ex. 2 + 5 + 6) | 1:1:1 |
| D | Butyl triglycol/BuCP2 (from Ex. 2 + 4) | 2:1 |
| E | Butyl triglycol/MPEG 500 (from Ex. 2 + 6) | 1:2 |
| F | MPEG 350/MPEG 500 (from Ex. 7) | 1:1 |

Preparation of the Urea Urethanes

Examples 8–14

Example 8

15.9 g of LiCl and 68 g (0.5 mol) of xylylenediamine are dissolved in 403 g of N-methylpyrrolidone at 80° C. Then 320 g of the mixture A are added in 1 h. When addition is complete, stirring is continued for 30 minutes and then the solution is cooled to RT. The resulting urea urethane solution has a solids content of 50%. The product is clear and remains stable for a relatively long time without forming gel.

Example 9

15.9 g of LiCl and 68 g (0.5 mol) of xylylenediamine are dissolved in 656 g of N-methylpyrrolidone at 80° C. Then 572 g of the mixture B are added in 1 h. When addition is complete, stirring is continued for 30 minutes and then the solution is cooled to RT. The resulting urea urethane solution has a solids content of 50%. The product is clear and remains stable for a relatively long time.

Example 10

25.8 g of $LiNO_3$ and 68 g (0.5 mol) of xylylenediamine are dissolved in 690 g of N-methylpyrrolidone at 80° C. Then 472 g of the mixture C are added in 1 h. When addition is complete, stirring is continued for 30 minutes and then the solution is cooled to RT. The resulting urea urethane solution has a solids content of 45%. The product is clear over a prolonged period.

Example 11

25.8 g of $LiNO_3$ and 68 g (0.5 mol) of xylylenediamine are dissolved in 760 g of dimethylacetamide at 80° C. Then 413 g of the mixture D are added in 1 h. When addition is complete, stirring is continued for 30 minutes and then the solution is cooled to RT. The resulting urea urethane solution has a solids content of 40%. The product is clear and remains stable for a relatively long time.

Example 12

15.9 g of LiCl and 84 g (0.5 mol) of hexamethylene diamine are dissolved in 830 g of N-methylpyrrolidone at 80° C. Then 580 g of the mixture E are added in 1 h. When addition is complete, stirring is continued for 30 minutes and then the solution is cooled to RT. The resulting urea urethane solution has a solids content of 45%. The product is clear and remains stable for a relatively long time.

Example 13

15.9 g of LiCl and 84 g (0.5 mol) of hexamethylene diamine are dissolved in 630 g of N-methylpyrrolidone at 80° C. Then 320 g of the mixture A are added in 1 h. When addition is complete, stirring is continued for 30 minutes and then the solution is cooled to RT. The resulting urea urethane solution has a solids content of 40%. The product is clear and remains stable for a relatively long time without forming gel.

Example 14

15.9 g of LiCl and 68 g (0.5 mol) of xylylene diamine are dissolved in 497 g of N-methytpyrrolidone at 80° C. Then 413 g of the mixture F are added in 1 h. When addition is complete, stirring is continued for 30 minutes and then the solution is cooled to RT. The resulting urea urethane solution has a solids content of 50%. The product is clear and remains stable for a relatively long time without forming gel.

Example 15

11.1 g of LiCl and 47.6 g (0.5 mol) of para-xylylene diamine are dissolved in 460 g of N-methylpyrrolidone at 80° C. Then 400.4 g of the mixture B are added in 1 h. When addition is complete, stirring is continued for 30 minutes and then the solution is cooled to RT. The resulting urea urethane solution has a solids content of 50%. The product is clear and remains stable for a relatively long time.

Example 16

15.5 g of $LiNO_3$ and 68 g (0.5 mol) of para-xylylene diamine are dissolved in 414 g of N-methylpyrrolidone at 80° C. Then 283.2 g of the mixture C are added in 1 h. When addition is complete, stirring is continued for 30 minutes and then the solution is cooled to RT. The resulting urea urethane solution has a solids content of 45%. The product is clear over a prolonged period.

APPLICATION EXAMPLES

The urea urethane solutions prepared by the process of the invention were tested in water and in water/solvent mixtures for their compatibility and for their rheological effectiveness.

To examine the compatibility and the rheological effectiveness in water and in water/solvent mixtures, the urea urethanes are incorporated into water or into the water/solvent mixtures with stirring for 2 minutes at a shear rate of 1 m/sec. Assessment is made after 4 hours.

Evaluation of the rheological effectiveness: 1=thick gel, 6=no gel.

Evaluation of the compatibility: 1=clear solution, 6=precipitation of the urea urethanes

TABLE 3

Application results I

| Additives | Water/butyl glycol 95:5 | | Water/methoxypropanol 95:5 | |
|---|---|---|---|---|
| | Rheological effectiveness | Compatibility | Rheological effectiveness | Compatibility |
| Compar. Ex. | 4 | 5 | 3–4 | 4–5 |
| Example 10 | 2–3 | 2–3 | 2 | 3 |
| Example 9 | 3 | 1–2 | 1 | 3–4 |
| Example 12 | 3 | 1–2 | 1 | 3 |

| Additives | Water/methoxypropanol 90:10 | | Water/butyl glycol/methoxypropanol 95:2.5:2.5 | |
|---|---|---|---|---|
| | Rheological effectiveness | Compatibility | Rheological effectiveness | Compatibility |
| Compar. Ex. | 4 | 5 | 3 | 4 |
| Example 10 | 1 | 2–3 | 1–2 | 2 |
| Example 9 | 1–2 | 2–3 | 2 | 1–2 |
| Example 12 | 2 | 2–3 | 2 | 1–2 |

To examine the anti-settling effect of the urea urethanes of the invention, pigment slurries were prepared and the sedimentation behavior was examined after 3 weeks' storage.

To prepare the pigment slurries, first of all a mixture of water, butyl glycol and Disperbyk® 192 is prepared. This mixture is then added with stirring to the pigment, Iriodin 9303 Royal Gold WR II from Merck. Thereafter, the urea urethanes of the invention are incorporated likewise with stirring using a Dispermat® CV (produced by VMA Getzmann GmbH, Reichshof, German), for 2 minutes at a shear rate of 2 m/s. To assess the sedimentation behavior, these slurries are introduced into a glass tube (10 cm high, 1.5 cm ⌀) to a height of 7.5 cm. The syneresis is determined after 3 weeks' storage at RT.

TABLE 4

Application results II

| | Control | Compar. Ex. | Example 10 | Example 12 |
|---|---|---|---|---|
| Iriodin 9303 Royal Gold WR II | 30.0 | 30.0 | 30.0 | 30.0 |
| Water | 64.5 | 64.5 | 64.5 | 64.5 |
| Butyl glycol | 4.0 | 4.0 | 4.0 | 4.0 |
| Disperbyk ® 192 | 1.5 | 1.5 | 1.5 | 1.5 |
| Urea urethane | | 1.0 | 1.0 | 1.0 |

(Table 4 indicates the relative fractions of the individual components in the mixture)

TABLE 5

Anti-settling effect

| | Control | Compar. Ex. | Example 10 | Example 12 |
|---|---|---|---|---|
| Total height | 7.5 cm | 7.5 cm | 7.5 cm | 7.5 cm |
| Syneresis | 4.2 cm | 1.7 cm | 0.1 cm | 0 cm |

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A process for preparing a compound having formula (II)

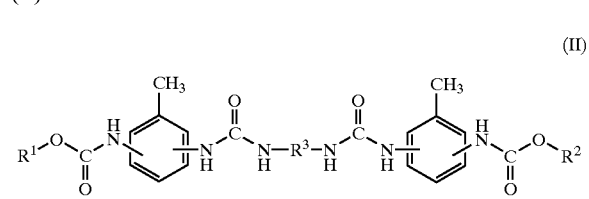

comprising reacting a mixture of monoisocyanate compounds having formulas (II) and (III):

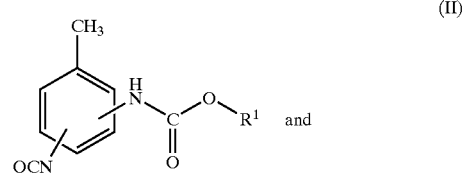

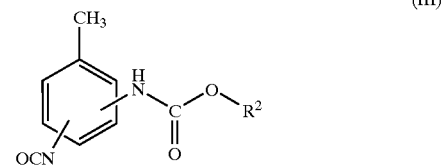

with a diamine having the formula $H_2N$—$R^3$—$NH_2$ or

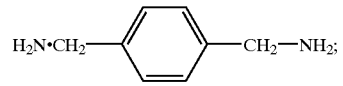

wherein $R^1$ and $R^2$ are independently $C_{4-22}$alkyl, $C_{3-18}$alkenyl, $C_{3-8}$cycloalkyl, aryl$C_{1-8}$alkyl, or a group having the formula —$C_mH_{2m+1}(O$—$C_nH_{2n})_x$, —$C_mH_{2m+1}(OC(O)$—$C_vH_{2v})_x$ or —Z—$C_6H_4(O$—$C_nH_{2n})_x$; wherein Z is $C_{1-12}$alkylene;

$R^3$ is —$C_iH_{2i}$—, —$(C_pH_{2p}$—O—$C_pH_{2p})_q$,

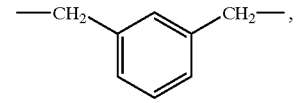

-continued

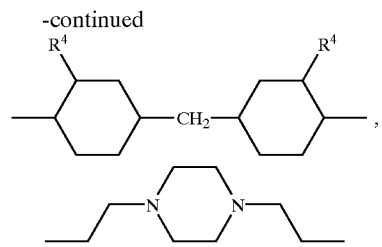

or a mixture thereof; and
R$^4$ is CH$_3$ or hydrogen;
wherein i is from about 2 to about 12; p is from about 2 to about 4; q is from 1 to about 10; m is 1–22; n is 2–4; x is 1–15; and v is 4 or 5;
in an aprotic solvent in the presence of a lithium salt;
provided that R$^1$ and R$^2$ are different.

2. The process according to claim 1, wherein the diamine has the formula:

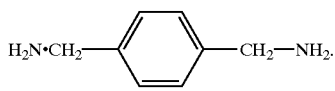

3. The process according to claim 1, further comprising preparing the mixture of mono-isocyanate compounds by reacting a mixture of two different alcohols, R$^1$ —OH and R$^2$ —OH, with a 1.5- to about a 5-fold excess of toluene diisocyanate.

4. The process according to claim 1, wherein monoisocyanate compounds are prepared separately and blended to provide the mixture.

5. The process according to claim 1, wherein compound is prepared in a solution comprising a solids content of from 5 to 80% by weight.

6. The process according to claim 5, wherein the solution is thixotropic.

7. The process according to claim 3, wherein the toluene diisocyanate is a mixture of a 2,4-isomer and of a 2,6-isomer.

8. The process according to claim 7, wherein the toluene diisocyanate has from about 50 to about 100% by weight of the 2,4-isomer.

9. The process according to claim 7, wherein the toluene diisocyanate has from about 65% by weight of the 2,4-isomer.

10. The process according to claim 9, wherein the toluene diisocyanate has from about 80% by weight of the 2,4-isomer.

11. The process according to claim 1, wherein the molar ratio of lithium salt to diamine is from about 0.2 to about 2.0, based on the equivalent weight of diamine.

12. The process according to claim 11, wherein the molar ratio of lithium salt to diamine is from about 0.5 to about 1.5, based on the equivalent weight of diamine.

13. The process according to claim 12, wherein the molar ratio of lithium salt to diamine is from about 0.75 to about 1.25, based on the equivalent weight of diamine.

14. The process according to claim 1, wherein the lithium salt is LiNO$_3$.

15. A compound having formula (II)

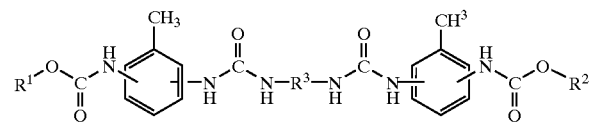

(II)

wherein
R$^1$ and R$^2$ are independently C$_{4-22}$alkyl, C$_{3-18}$alkenyl, C$_{3-8}$cycloalkyl, arylC$_{1-8}$alkyl, or a group having the formula —C$_m$H$_{2m+1}$(O—C$_n$H$_{2n}$)$_x$, —C$_m$H$_{2m+1}$(OC(O)—C$_v$H$_{2v}$)$_x$ or —Z—C$_6$H$_4$(O—C$_n$H$_{2n}$)$_x$; Z is C$_{1-12}$alkylene;
R$^3$ is —C$_i$H$_{2i}$—, —(C$_p$H$_{2p}$—O—C$_p$H$_{2p}$)$_q$,

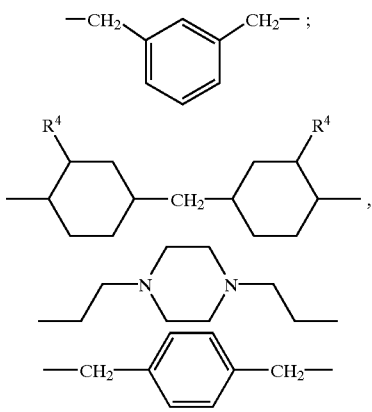

or a mixture thereof; and
wherein
R$^4$ is CH$_3$ or hydrogen;
i is from about 2 to about 12, p is from about 2 to about 4, q is from 1 to about 10, m is 1–22, n is 2–4, x is 1–15, and v is 4 or 5;
provided that R$^1$ and R$^2$ are different.

16. The compound of claim 15, wherein R$^1$ and R$^2$ are independently n-butyl, butyl triglycol, 2-ethylhexyl, isotridecyl, oleyl, linoleyl, lauryl, stearyl, cyclohexyl, benzyl, methoxypolyethylene glycol or C$_4$H$_9$—O—C(O)—(CH$_2$)$_5$—.

17. The compound of claim 16, wherein R$^1$ and R$^2$ are independently n-butyl, butyl triglycol, isotridecyl, methoxypolyethylene glycol 500, methoxypolyethylene glycol 350 or C$_4$H$_9$—O—C(O)—(CH$_2$)$_5$—.

18. The compound of claim 16, wherein R$^1$ and R$^2$ are independently butyl triglycol, methoxypolyethylene glycol 500 or methoxypolyethylene glycol 350.

19. The compound of claim 15, wherein R$^3$ is propyl, hexamethyl, octamethyl, dodecyl, neopentyl, dicyclohexylmethyl, or 3,3'-dimethyl-dicyclohexyl-methyl, meta-xylyl or para-xylyl.

20. The compound of claim 19, wherein R$^3$ is, hexamethyl, meta-xylyl or para-xylyl.

* * * * *